United States Patent
Owens et al.

(10) Patent No.: US 11,752,427 B2
(45) Date of Patent: Sep. 12, 2023

(54) DETECTING EVENTS IN A LIVESTREAM VIDEO OF A VIDEO GAME IN AN ESPORTS COMPEITLION

(71) Applicant: Microsoft Technology Licensing, LLC, Redmond, WA (US)

(72) Inventors: Willie Owens, Atlanta, GA (US); Nathan Welch, Atlanta, GA (US); Donald Frank Brinkman, Jr., Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 47 days.

(21) Appl. No.: 17/330,169

(22) Filed: May 25, 2021

(65) Prior Publication Data

US 2022/0379203 A1 Dec. 1, 2022

(51) Int. Cl.
*A63F 13/00* (2014.01)
*A63F 13/355* (2014.01)
*G06N 20/00* (2019.01)
*A63F 13/46* (2014.01)

(52) U.S. Cl.
CPC ............ *A63F 13/355* (2014.09); *A63F 13/46* (2014.09); *G06N 20/00* (2019.01); *A63F 2300/572* (2013.01)

(58) Field of Classification Search
None
See application file for complete search history.

(56) References Cited

U.S. PATENT DOCUMENTS

| | | | |
|---|---|---|---|
| 11,458,405 B1* | 10/2022 | Welch | A63F 13/35 |
| 2018/0077440 A1* | 3/2018 | Wadhera | H04N 21/8456 |
| 2022/0327832 A1* | 10/2022 | Soman | G06V 20/44 |
| 2022/0329881 A1* | 10/2022 | Soman | H04N 21/233 |

OTHER PUBLICATIONS

"How to Organize a Warzone Killrace", Retrieved From: https://www.youtube.com/watch?v=goxbfzdf1w8, Feb. 17, 2021, 1 Page.
Gibson, Chad, "Watch for Identifies and Surfaces the Most Interesting Parts of a Livestream in Real-Time", Retrieved From: https://www.microsoft.com/en-us/garage/wall-of-fame/watch-for/, Retrieved Date: Mar. 24, 2021, 7 Pages.

* cited by examiner

*Primary Examiner* — Sunit Pandya
(74) *Attorney, Agent, or Firm* — CALFEE, HALTER & GRISWOLD LLP

(57) ABSTRACT

A computing system obtains a video of a video game being played, where an esports competition includes play of the video game by a video game player. The computing system identifies, in the video and through use of machine vision technologies, occurrence of an event in the video game depicted in the video, where the machine vision technologies have been trained to detect occurrences of the event in videos, and further where an outcome of the esports competition is based upon the occurrence of the event in the video game. The computing system also outputs a value that is indicative of the occurrence of the event in the video game depicted in the video, where a score for the video game player is updated in the esports competition based upon the value.

20 Claims, 7 Drawing Sheets

DETECTING EVENTS IN A LIVESTREAM VIDEO OF A VIDEO GAME IN AN ESPORTS COMPEITLION

BACKGROUND

Popularity of electronics sports ("esports") has increased over a relatively short amount of time due at least partially to proliferation of livestreaming services. Esports is a form of competition where multiple video game players (competitors) compete against one another with respect to play of a video game. Competitors livestream their gameplay by way of a livestreaming service, and multiple viewers can watch a livestream video of a competitor who is livestreaming his or her gameplay. Livestreaming refers to online streaming media that is broadcast in real-time, which is different from other types of streaming media (such as video on demand) as the other types of streaming media are streamed to client computing devices from a streaming service but are not "live".

Computer implemented platforms have begun to provide esports competitions with a "race" format, where esports competitors are racing towards a predefined goal. A predefined goal may include the timed completion of a set of events in a video game, or the largest (or smallest) value obtained in a video game by attributing events in the game to parameters of a predefined function resulting in a single, or multiple, set of output variables. Such events and outputs need not be tied to the goals of the video game as defined by the developer of such video game, providing competitors new sets of goals and experiences that these video game developers did not anticipate. For example, a goal of an automobile racing video game, as intended by the developer of the game, is to be in first place upon completing a threshold number of laps of a racecourse. In an esports competition having a race format, however, the goal of the esports competition may be to run over as many traffic cones as possible within some predefine period of time, such as two hours. Thus, esports competitions with race formats allow for competition to occur with respect to a video game that was unanticipated by a developer of the video game, yet enjoyable to participants in the esports competition (as well as viewers of the esports competition).

Conventionally, determining status (e.g., tracking scores of competitors) in an esports competition having a race format is a manual and arduous process. In some esports platforms, a competitor is tasked with tracking his or her own score, where the competitor self-reports an achievement in a video game that results in a change in his or her score, and if required, provides some form of proof of the achievement (e.g., a screenshot that depicts the achievement by the competitor). Further, in some esports platforms, an administrator of the esports platform watches a video of the video game being played by the competitor, and manually identifies achievements of the competitor as depicted in the video of play of the video game (where the identified achievements impact the score of the competitor in the esports competition). It can thus be ascertained that conventional esports platforms are limited as to a number of competitors who can participate in an esports competition with a race format (as the number of competitors may be limited to the number of administrators who can monitor gameplay) and/or are limited as to verifying accuracy of self-reported achievements.

SUMMARY

The following is a brief summary of subject matter that is described in greater detail herein. This summary is not intended to be limiting as to the scope of the claims.

Described herein are various technologies pertaining to employment of machine vision technologies to recognize occurrences of events in video games being played by esports competitors in an esports competition having a race format; the technologies described herein also pertain to updating scores for the esports competitors who are participating in the esports competition based upon the recognized occurrences of events. Pursuant to an example, the machine vision technologies are trained to recognize occurrences of several different events across several different video games, where the machine vision technologies receive livestream videos of the video games being played by esports competitors. The machine vision technologies recognize the occurrences of the events in the livestream videos based upon graphics in the livestream videos (e.g., over time), audio in the livestream videos, etc.

In a non-limiting example, the machine vision technologies are configured to detect destruction of adversarial vehicles in the Rocket League video game. A designer of an esports competition can construct the competition to have a race format, where competitors in the esports competition have a goal of destroying as many adversarial vehicles as possible in the Rocket League video game over a predefined time window (e.g., the next 12 hours). Livestream videos of the Rocket League video game being played by the competitors in the esports competition are obtained by the machine vision technologies, and the machine vision technologies automatically detect each occurrence of an adversarial vehicle being destroyed in the livestream videos.

Further, as the machine vision technologies can detect occurrences of events in different games, the designer of the esports competition can design the competition to be across several different video games and can further specify a sequence in which the different video games are to be played in the esports competition and/or a sequence in which occurrences of events are tracked the esports competition. Continuing with the example set forth above, the designer of the esports competition defines such competition such that the outcome of the competition is dependent upon a number of adversarial vehicles destroyed in the Rocket League video game over a first time window as well as a number of survivors rescued in the Fortnite video game over a second time window that is subsequent to the first time window. Accordingly, the designer of an esports competition having a race format can design a nearly unlimited number of different esports competitions without requiring competitors to self-report occurrences of events and further without requiring administrators to monitor gameplay during the esports competition.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
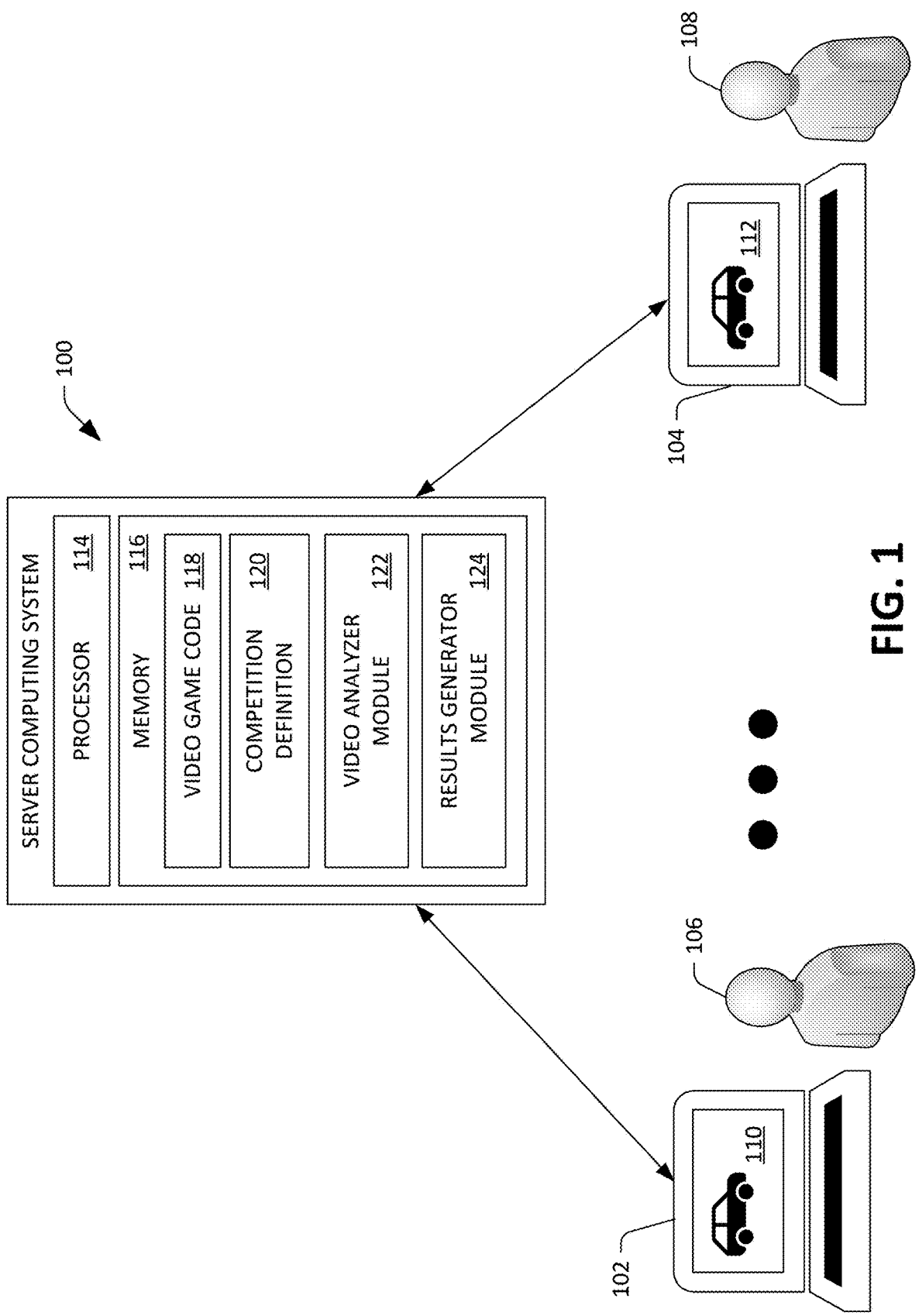
FIG. 1 is a functional block diagram of an example server computing system that is configured to recognize occurrences of events in livestream video of video games being played by competitors in an esports competition.

Various technologies pertaining to detecting occurrences of events in a livestream video of a video game being played as part of an esports competition are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Described herein are various technologies pertaining to use of machine vision technologies to detect occurrences of events in a video of a video game (such as but not limited to a livestream video of a video game); the technologies additionally pertain to updating a score for a competitor in an esports competition (where the esports competition optionally has a race format) based upon the detected occurrences of the events. A race format refers to performing a goal (or goals) in a video game (or video games) with respect to time (e.g., obtaining as high of a score as possible within a threshold amount of time, achieving a threshold score as quickly as possible, completing a goal within a threshold amount of time or as quickly as possible, etc.). In these examples, the winner of the esports competition (or a match in the esports competition) is the competitor who obtains the highest score within the threshold amount of time, achieves the threshold score most quickly from amongst esports competitor(s) competing in a match, completes the goal most quickly, etc. The technologies described herein are also applicable to esports competitions that do not necessarily have a race format; such as an esports competition where a competitor attempts to perform a certain number of achievements before dying in the video game a threshold number of times (e.g., once). In contrast to conventional approaches, a video of a video game being played by a competitor in the esports competition is obtained by a machine vision system, which is configured to detect occurrences of events upon which outcome of the esports competition is based. For instance, when the esports competition is based upon destruction of adversarial vehicles in the Rocket League game, the machine vision system is configured to detect occurrences of adversarial vehicles being destroyed in the video and is further configured to output an indication each time an adversarial vehicle is destroyed in the video. The number of times that an adversarial vehicle is destroyed is counted, and outcome of the esports competition is based upon the number of times that the adversarial vehicle is destroyed.

Further, using the technologies described herein, a designer of an esports competition (e.g., where the esports competition is to be played on a streaming platform that supports esports competitions) can design the competition such that the outcome of the competition depends upon occurrences of events of different types across several different video games. For instance, the designer of the esports competition can create a competition whose outcome depends upon a number of occurrences of a first event (or achievement of a first goal) in a first video game as well as a number of occurrences of a second event (or achievement of a second goal) in a second video game. The machine vision technologies described herein can be trained based on game video and/or game audio (e.g., trained using supervised learning techniques and based upon portions of videos of video game play that are labeled as including an event) to detect any suitable event in video games, thereby providing a designer of the esports competition with wide latitude in designing the esports competition (e.g., having a race format). This extends playability of video games, as certain skills in video games that may be tertiary to the goals of the video games (as set forth by developers of the video games) may be central to an esports competition.

With reference now to FIG. 1, a functional block diagram of an example server computing system 100 of a streaming platform that supports esports competition is illustrated. While FIG. 1 depicts a server computing system, it is to be understood that the technologies described herein can be implemented in a cloud computing environment, where different users are in communication with different nodes that collectively provide the functionality described herein. Client computing devices 102-104 operated by esports competitors 106-108, respectively, are in communication with the server computing system 100 by way of a network (not shown), such as the Internet. The competitors 106-108 employ the client computing devices 102-104, respectively, to play a video game, where outcome of an esports competition is based upon play of the video game by the competitors 106-108. The client computing devices 102-104 include respective displays 110-112, and the video game, as played by the competitors 106-108, is presented on the displays 110-112.

In the example illustrated in FIG. 1, the video game is one where the competitors 106-108 control operation of a vehicle to perform some task; it is to be understood, however, that the esports competition may include play of any suitable video game. Further, while FIG. 1 illustrates the competitors 106-108 playing the same video game at the same time as part of the esports competition, it is contemplated that the competitors 106-108 may play the video game at different times or may be playing different video games as part of the esports competition.

The client computing devices 102-104 generate videos of gameplay of the video game (as depicted on the displays 110-112, respectively), and the server computing system 100 obtains the videos. More specifically, the first client computing device 102 generates and outputs a first video that depicts play of the video game by the first competitor 106, and the Nth client computing device 104 generates and outputs an Nth video of the video game as played by the Nth competitor 108. In an example, the videos can be livestream videos.

The server computing system 100 obtains, either directly or indirectly, videos-N. More specifically, the server computing system 100 can obtain videos 1-N directly from the client computing devices 102-104, respectively. In another example, the server computing system 100 obtains videos 1-N from a streaming service, where the client computing devices 102-104 transmit the videos to the streaming service, and the server computing system 100 obtains the livestream videos from the livestreaming service. In another example, one or more of the videos 1-N may be recorded by the competitors 106-108 on the client computing devices 102-104 and uploaded directly or indirectly to the server computing system 100. In yet another example, one or more of the videos 1-N may be recorded on a streaming service, and the competitors can direct the streaming service to transmit the recorded videos to the computing system 100.

As indicated previously, the competitors 106-108 are competing against one another in an esports competition that optionally has a race format. In an example, the winner of the esports competition is the competitor from amongst the competitors 106-108 who, in the video game, runs over the most traffic cones within a one-hour time window. Conventionally, each of the competitors 106-108 would record their gameplay and generate screenshots each time that a vehicle controlled by the competitor ran over a traffic cone. In contrast, and as will be described in greater detail herein, the server computing system 100 is configured to automatically identify occurrences of events (such as vehicles controlled by the competitors running over traffic cones) depicted in video of the video game being played, such that outcome of the esports competition is determined based upon the occurrences detected by the server computing system 100.

The server computing system 100 includes a processor 114 and memory 116, where the memory 116 includes data that is accessed by the processor 114 and modules that are executed by the processor 114. As illustrated in FIG. 1, the memory 116 optionally includes a server-side code for a video game 118 that is being played by the competitors 106-108 as part of the esports competition. For instance, the video game code 118 receives state information from the client computing devices 102-104, where the state information identifies different states of the video game being played at the client computing devices 102-104. The video game code 118 causes the server computing system 100 to transmit the state information to the client computing devices 102-104, thereby enabling the competitors 106-108 to simultaneously play the video game in a shared environment (i.e., allow for multiplayer play of the video game). Optionally, the video game code 118 executing on the server computing system 100 can cause the server computing system 100 to generate and transmit graphic information (e.g., frames) to the client computing devices 102-104 for display on the displays 110-112 of the client computing devices 102-104.

The memory 112 further includes a competition definition 120 that defines parameters of the esports competition. The competition definition 120 includes information such as a name for the esports competition, a number of different video games involved in the esports competition, an identity of each video game involved in the esports competition, identities of different events in video games that are to be detected as part of the esports competition, start times corresponding to the different events, a duration of the esports competition, a number of points for an occurrence of an event (e.g., 1 point for destruction of an adversarial vehicle in the Rocket League video game, 5 points for rescue of a hostage in the Fortnite video game), a number of points required to win an esports match (e.g., first to 500 points wins), sequence in which games are to be played and/or events are to be completed (e.g., a competitor must obtain a first threshold number of points with respect to a first event and thereafter must obtain a second threshold number of points with respect to a second event), one or more time constraints (e.g., a competitor must start play between a first time and a second time), identities of competitors who are competing in the esports competition, etc. It is to be understood that the competition definition 120 can include any suitable information for defining parameters of the esports competition.

The memory 116 also includes a video analyzer module 122 that obtains the videos generated and output by the client computing devices 102-104 and recognizes occurrences of events identified in the competition definition 120. For instance, the competition definition 120 can indicate that outcome of the esports competition is based upon destruction of an adversarial vehicle in the Rocket League video game. The video analyzer module 122 obtains the videos output by the client computing devices 102-104, where the videos depict play of the Rocket League video game by the competitors 106-108 during a time window specified in the competition definition 120.

The video analyzer module 122 identifies each occurrence that an adversarial vehicle is destroyed in the videos, and outputs a value that indicates that the event has occurred in the video game. Further, the output of the video analyzer module 122 can include an identity of the esports competition, an identity of the video game, an identity of the competitor playing the video game, an identity of the detected event, etc. The video analyzer module 122, in an example, outputs such information for each detected occurrence of an event in the esports competition.

The video analyzer module 122 can include any suitable technology for automatically detecting events in videos of video games; for instance, the video analyzer module 122 can include one or more deep neural networks (DNNs), including one or more recurrent neural networks (RNNs). In an example, the video analyzer module 122 may be constructed using Tensorflow.

In an example, the video analyzer module 122 can include a hierarchical arrangement of models. For instance, the hierarchical arrangement may include a first model that is configured to detect an identity of the video game being played in the video, and optionally detect (and validate) a version of the video game (as an esports competition may require a competitor to play a region-specific version of a video game, a particular updated version of a video game, etc.). In connection with validating the version of the video game, the first model of the video analyzer module can ascertain refresh rates of the video game, can ascertain how elements are loaded into the video game, etc. The video analyzer module 122 can further include a second game-specific model that is configured to identify events in the video game identified by the first model.

Thus, the video analyzer module 122 includes numerous computer-implemented models, where models may be specific to a video game and an event in the video game, and further where a model is configured to identify occurrence of the event in livestream videos of the video game. Continuing with this example, the video analyzer module 122 includes a first computer-implemented model and a second computer-implemented model, where the first computer-implemented model is configured to detect occurrences of a first event in a first video game, and the second computer-implemented model is configured to detect occurrences of a second event in a second video game. In a more specific example, the first computer-implemented model is configured to detect a goal in the Rocket League video game, while the second computer-implemented model is configured to detect a golf ball hitting a fairway in the PGA Tour golf 2K1 video game. When the competition definition 120 identifies the video game and the event for the esports competition, the server computing system 100 loads the computer-implemented model for the video game and the event into memory as part of the video analyzer module 122.

The server computing system 100 further includes a results generator module 124 that is configured to receive output of the video analyzer module 122 and update the status of the esports competition based upon the output of the video analyzer module 122. The results generator module 124 can update the status of the esports competition in real-time, and provide information as to the status of the esports competition to competitors in the esports competition as well as viewers of the esports competition (where the viewers are watching videos of the competitors 106-108 playing video games in the esports competition). Further, the results generator module 124 identifies a time when the esports competition completes based upon information in the competition definition 120, and further identifies a winner of the esports competition (or a match in the esports competition) based upon outputs of the video analyzer 122 over time. In an example, when the goal of the esports competition is to destroy the largest number of adversarial vehicles in the Rocket League video game within one hour, the results generator module 124 can receive outputs from the video analyzer module 122, where each output indicates that an adversarial vehicle has been destroyed and further identifies the competitor in the esports competition who destroyed the adversarial vehicle in the video game. The results generator module 124 receives such outputs for the duration of the esports competition, updates status of the esports competition upon receiving an output and identifies a winner of the esports competition based upon the outputs of the video analyzer module 122.

Still further, the results generator module 124 may be in communication with the video game code 118 at the server computing system 100 and/or may be in communication with the video game as executed at the client computing devices 102-104. The video game may report occurrences of some events by way of an application programming interface (API), and the results generator module 124 can obtain reports of such occurrences from the video game code 118 (or the client-side video game code) by way of the API and can update the status of the esports competition based upon the reported event occurrences. Events in the competition definition 120 can include events that are reported by the video game.

It can be ascertained that the server computing system 100, when included in a streaming platform (such as a livestreaming platform) that supports esports competitions, exhibits various advantages over conventional approaches for defining parameters of esports competitions and updating status of esports competitions. Rather than forcing the competitors themselves to manually update their statuses and provide proof of occurrences of events, or have another human monitor play of the video game by the competitors to verify occurrences of events, the server computing system 100 allows for an esports competition designer to define parameters of an esports competition, and the server computing system 100 automatically monitors gameplay of competitors in the esports competition and updates status of the esports competition based upon detected occurrences of events in videos of the video games being played by competitors. Further, the designer of the esports competition can design the esports competition using a wide variety of parameters, such that the esports competition can include multiple different video games, can require video games and/or events to occur in a specific sequence, can define time windows for each video game and/or event, etc.

It is also contemplated that the esports competition may be a speedrunning competition, where competitors are tasked with completing some task as quickly as possible (such as completing a game, completing a level in a game, etc.). Conventionally, competitors must manually track time from when the task is started to when it is completed, which may result in inaccuracies. The video analyzer module 122 is configured to recognize when a competitor starts the task and when the task is completed based upon content of video of video game play of the competitor, and is further configured to track time between such events (when the task is started and completed).

Moreover, while the description above notes that the video analyzer module 122 outputs indications of occurrences of events as such events occur (e.g., in a livestream video), in other embodiments the video analyzer module 122 can analyze a recorded event and output an aggregate of information that is germane to the esports competition.

Figure 2:
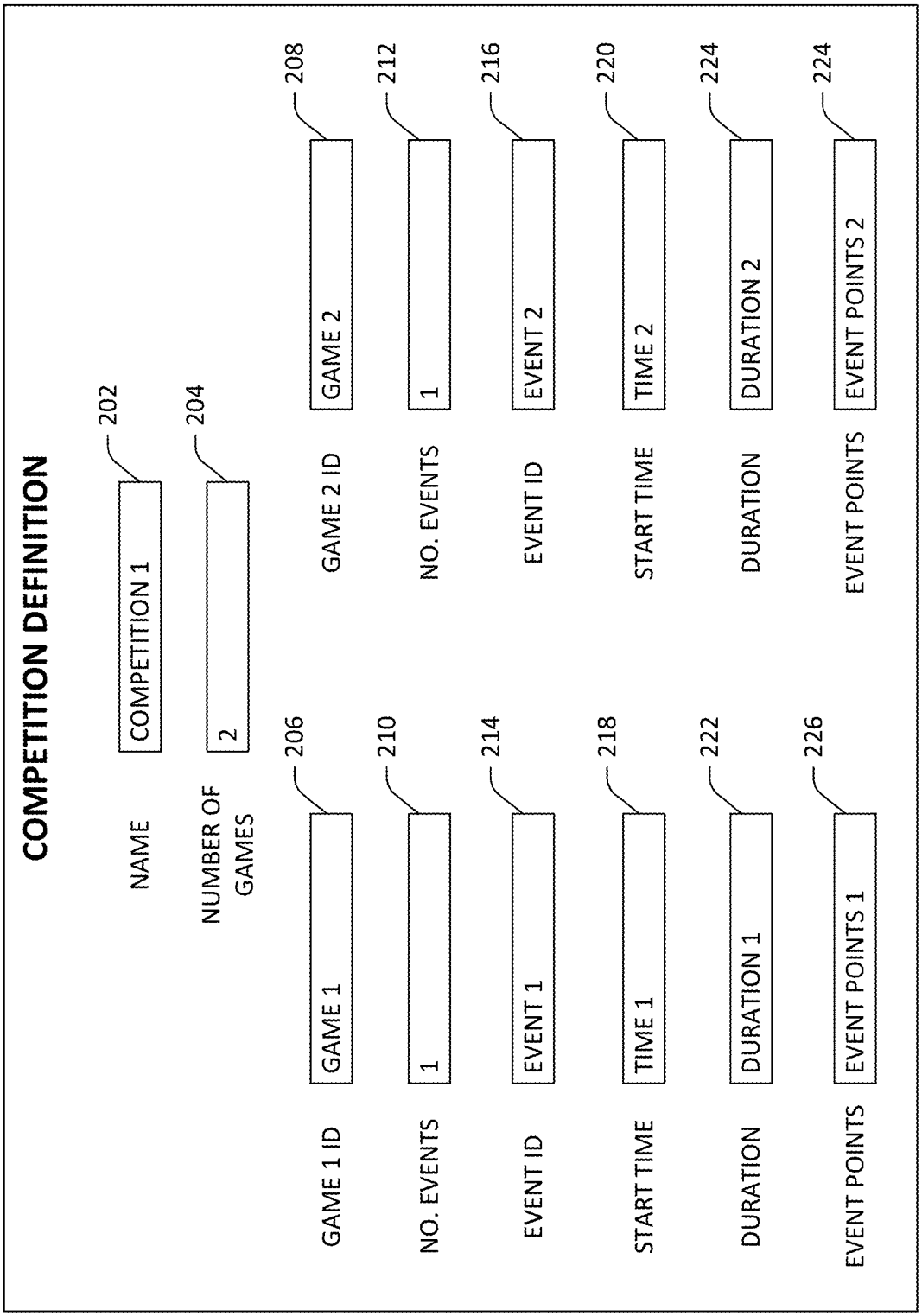
FIG. 2 is a schematic of an example graphical user interface (GUI) that is employable by a designer of an esports competition to define parameters of the esports competition.

With reference now to FIG. 2, an example graphical user interface (GUI) 200 that is employed by a designer of an esports competition is illustrated. While the GUI 200 illustrates various fields, it is to be understood that fields of the GUI 200 are not limited to the fields depicted in FIG. 2, and that other fields and/or other interactive elements for providing information that defines parameters of an esports competition are contemplated.

The GUI 200 includes a first field 202 that is configured to receive a name for the esports competition from a designer of the esports competition. In the example illustrated in FIG. 2, the first field 202 receives the name "competition 1" from the designer of the esports competition. The GUI 200 also includes a second field 204 that is configured to receive a number of video games that are to be included in the esports competition. Theoretically there is no limit as to the number of video games that may be included in an esports competition; however, in an example, the designer of the esports competition can set forth a value between 1 and 10 in the second field 204.

Upon the esports competition designer setting forth the value "2" in the second field 204, third and fourth fields 206 and 208, respectively, are presented in the GUI 200. The fields 206 and 208 are configured to receive identifiers for the video games that are to be included in the esports competition. For instance, the fields 206 and 208 are pull-down menus, which list identities of video games for which the video analyzer module 122 is configured to detect events and/or identities of video games that are configured to report occurrences of events by way of APIs. In the example set forth in FIG. 2, the esports competition designer identifies "game 1" as being the first video game included in the esports competition and identifies "game 2" as being the second video game included in the esports competition.

The GUI 200 also includes fields 210 and 212, where the designer of the esports competition can set forth a number of different events in each of the video games identified in the fields 206 and 208 that are to be detected in connection with the esports competition. Fields 214 and 216 are configured to receive identifiers of the events that are to be detected. In an example, the fields 214 and 216 have corresponding pull down menus that identify, for the video games identified in the fields 206 and 208, events that can be detected in such video games. For instance, twelve different possible events are detectable in "game 1", and the designer of the esports competition select an event from such list, where outcome of the esports competition is based upon occurrences of the event in the video game "game 1". In another embodiment, the fields 214 and 216 are configured to receive queries (e.g., natural language queries), and events are identified by searching a database of detectable events based upon the natural language queries.

The GUI 200 further includes fields 218 and 220, which are configured to receive times when the results generator module 124 is to begin to receive output from the video analyzer module 122 with respect to the events identified in the fields 214 and 216, respectively. In an example, the field 218 can include a first time, which defines when occurrences of the first event in the first video game are to initially be detected by the video analyzer module 122 and reported to the results generator module 124. The field 220 is configured to receive a second time that identifies when the occurrences of the second event in the second game are to initially be detected by the video analyzer module 122 and reported to the results generator module 124. It can thus be ascertained that the GUI 200 is configured to receive various information from the esports competition designer in connection with designing an esports competition, where such information can include a sequence of gameplay for competitors. Further, the times placed into the fields 218 and 220 may be identical, such that a competitor in the esports competition is able to choose a sequence of video games in the esports competition and/or a sequence of events in the esports competition.

The GUI 200 also includes fields 222 and 224 that are configured to receive durations of time over which the events identified in the fields 214 and 216, respectively, are to be detected. The durations identified in the fields 222 and 224 may define a sequence that a competitor is to complete the events in video games, may indicate that there is no sequence, etc. Fields 226 and 228 are configured to receive points for the events identified in the fields 214 and 216, respectively. For instance, the designer of the esports competition indicates that destruction of an adversarial vehicle in the Rocket League video game is worth 2 points in the esports competition, while a rescue of a hostage in the Fortnite video game is worth 5 points in the esports competition. The designer of the esports competition can set forth any suitable points definition when designing the esports competition.

From the foregoing, it can be ascertained that the designer of the esports competition, through utilization of the technologies described herein, can define a nearly limitless number of different esports competitions having different parameters. Once the esports competition is defined, the technologies described herein can automatically detect when a competitor is playing in the esports competition (e.g., by monitoring when the competitor starts to livestream gameplay), can detect events, can ensure that the detected events are occurring within the time window specified by the esports competition designer, etc.

Figure 3:
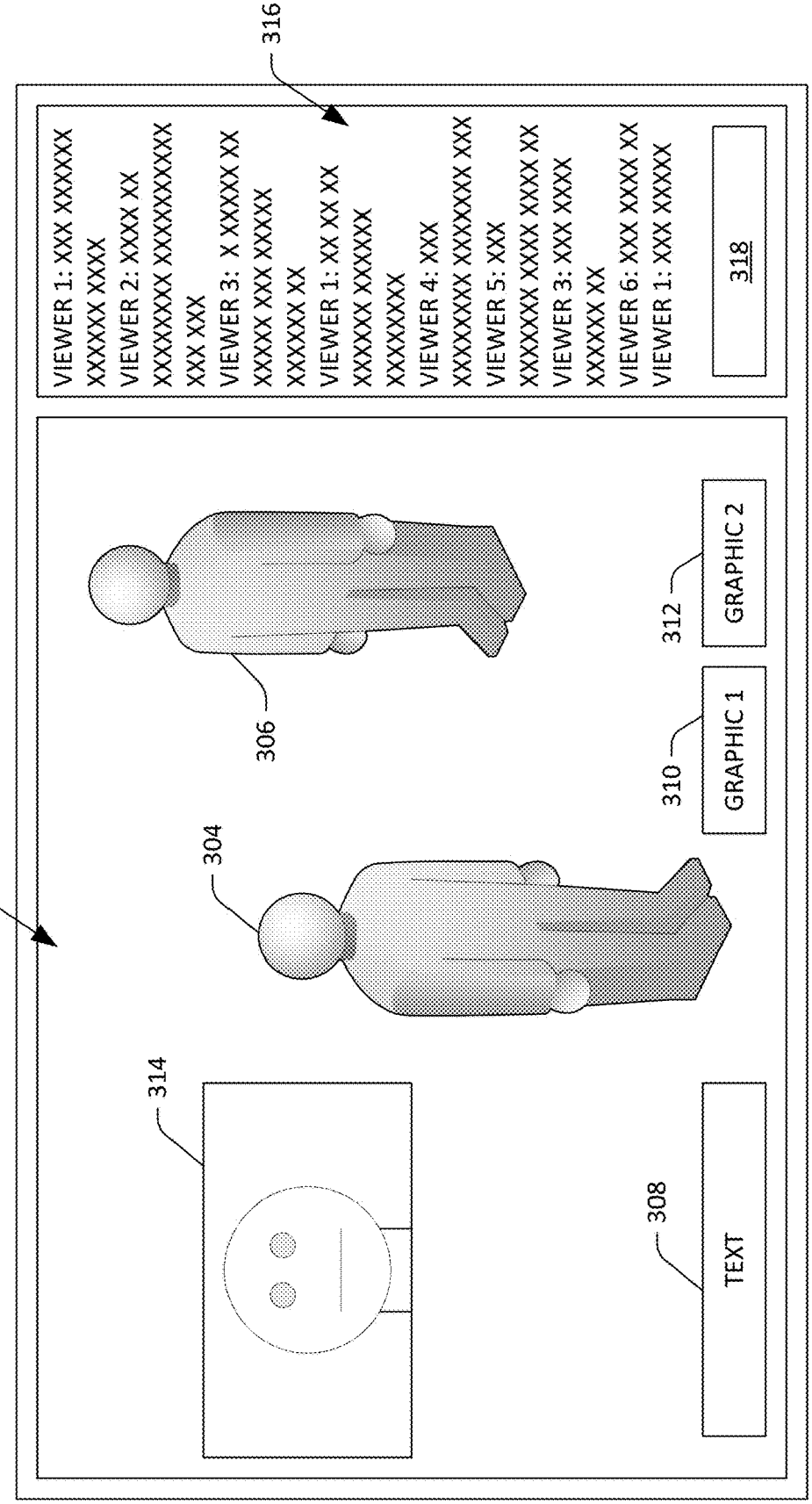
FIG. 3 depicts an example livestream video of a video game being played by a competitor in an esports competition.

Referring now to FIG. 3, a screenshot 300 of an example livestream video that can be received by the machine vision technologies described herein is illustrated. The screenshot 300 includes a livestream video 302 of a video game being played by a competitor in an esports competition. The video game may be any suitable type of video game including a first-person shooter, an adventure game, a racing game, etc. The livestream video 302 of the video game, in the example shown in FIG. 3, includes multiple characters 304 and 306, where at least one of the characters 304 and 306 is controlled by a competitor in the esports competition. The video 302 may further include text 308 generated by the video game while the video game is being played by the competitor. The text 308 maybe a transcription of audio set forth in the video game, an indication of a score or status of the video game, etc. The livestream video 302 can also include graphics 310 and 312 generated by the video game, where the graphics may indicate objects available to the competitor in the video game, skills acquired by the competitor during the video game, etc.

The livestream video 302 may also optionally include a video 314 of a face of the competitor that is captured by a video camera of a client computing device being used by the competitor to play the video game. The client computing device used by the competitor may also include a microphone to capture spoken utterances output by the competitor. Additionally, the screenshot 300 depicts a chat window 316 that accompanies the livestream video 302, where the chat window 316 includes text set forth by viewers of the competitor, such that viewers may interact with each other and the competitor as the competitor plays the video game. The chat window 316 may include a text entry field 318, where participants in the chat may set forth text into the text entry field 318 and the entered text can be included in the chat.

The video analyzer module 122 can analyze multiple frames to detect events that occur during play of the video game. As indicated above, the video analyzer module 122 can be or include a machine learning algorithm, such as a DNN, a RNN, etc. In another example, the video analyzer module 122 can include one or more rules that detect events based upon content in frames of the livestream video 302. For instance, the graphic 310 in the video game may include a number that changes each time a survivor is saved. The video analyzer module 122 can be configured to review the graphic 310 and identify when a number in the graphic 310 changes. Numerous other examples are contemplated.

Further, the video analyzer module 122 can receive secondary features and identify occurrences of events based upon secondary features, such as facial expressions in the video 314 of the face of the competitor (e.g., where an image of the competitor being frustrated or sad can be indicative of an inability of the competitor to complete an event), content in the chant window 316 (where text may indicate that the competitor has completed an event or failed to complete an event), etc.

The result analyzer module 124 can monitor time such that the appropriate (correct) number of events that occur in a video game can be detected and counted. For instance, when the esports competition has no defined start time but has a defined duration, the results generator module 124 can detect when the livestream of the video game play has begun. The results generator module 120 can start a clock and continue running the clock from the time that the livestream video 302 of play of the video game has begun until the livestream video 302 is no longer active. The results generator module 124 can track the number of occurrences of the event that have been detected by the video analyzer module 122 and can ascertain when the number of events meets a threshold, if applicable. In another example, the results generator module 124 can start the clock at the start time identified in the competition definition 120.

Figure 4:
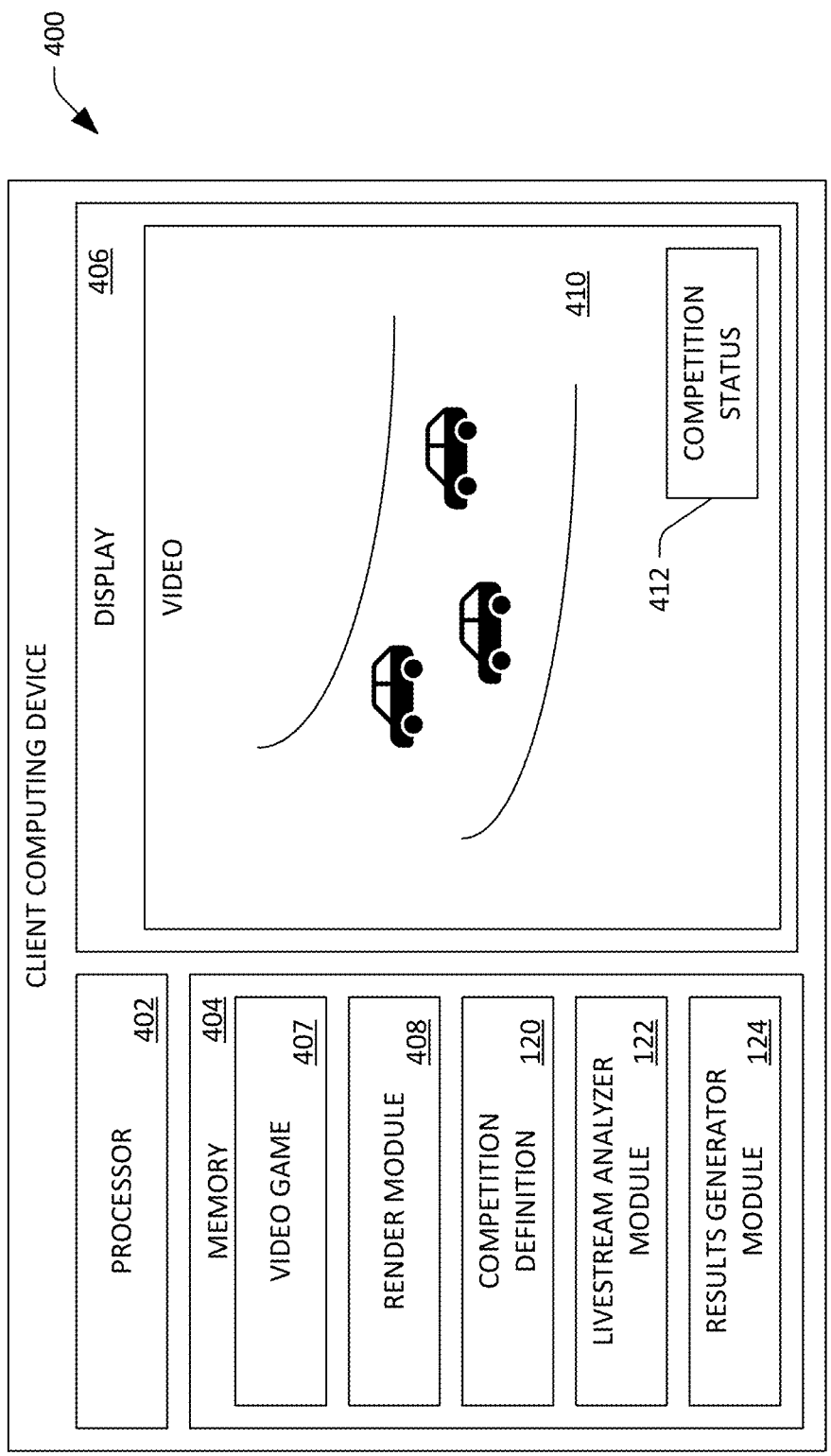
FIG. 4 is a functional block diagram of an example client computing device that is configured to detect occurrences of events in a video game being played at the client computing device.

Referring now to FIG. 4, an example client computing device 400 is illustrated. The client computing device 400 includes a processor 402 memory 404 that is operatively coupled to the processor 402. The client computing device 400 additionally includes a display 406 that is operably coupled to the processor 402. The memory 404 has a video game 407 loaded therein, and the processor 402 executes the video game 407 retained in the memory 404. The memory 404 further includes a render module 408 that renders graphics based upon execution of the video game 407 and causes video 410 of the video game 407 to be displayed on the display 406.

The memory 404 further includes the competition definition 120 that defines parameters of an esports competition. For instance, the user of the client computing device 400 can define the parameters of the competition definition 120 himself or herself, such that the user of the client computing device 400 can compete in a one-person competition. For instance, the video game 407 is an automobile racing game, and the competitor may wish to attempt to pass as many vehicles as possible in one lap. The user of the client computing device 400 can set forth such parameters in the competition definition 120, thereby allowing the competitor to create a customized esports competition for himself/ herself.

In the example shown in FIG. 4, the memory 404 further includes the video analyzer module 122 that detects occurrences of events identified in the competition definition 120. In an example, the video analyzer module 122 detects the events in real-time as the video 410 is shown on the display 406. Therefore, detection of the events occurs locally at the client computing device 400 rather than at a server that receives a video of the video game being played. The results generator module 124 generates results for the esports competition based upon outputs of the video analyzer module 122, as described above. The render module 408 can receive output of the results generator module 120, and can cause a competition status graphic 412 to be presented on the display 406 together with the video game. The competition status 412 can inform the user as to status of the esports competition (e.g., how close the user of the client computing device 400 is to winning the competition).

Execution of the video analyzer module 122 locally at the client computing device 400 allows for additional types of gameplay and/or esports competitions. For example, popular streamers of video games may form teams, and may ask that viewers that follow the streamers participate in an ad hoc esports competition, where viewers are participating in the competition as members of teams. The followers of the streamers can set up the competition definition 120 (and optionally share the competition definition 120), and may play the video game together with the streamer who they are following in an attempt to assist the team against the team led by the competitor streamer. Results of video analyzer modules executing on client computing devices are then be transmitted to the streamers being followed.

While this team concept has been described with respect to the video analyzer module 122 executing on client computing devices, it is to be understood that such concept can also occur with the video analyzer module 122 executing on a server computing system. Viewers can register with teams, and the teams can be registered with an esports competition platform. The server computing system 100 may then track how the individual competitors are doing over time with respect to the esports competition as defined in the competition definition 120.

Figure 5:
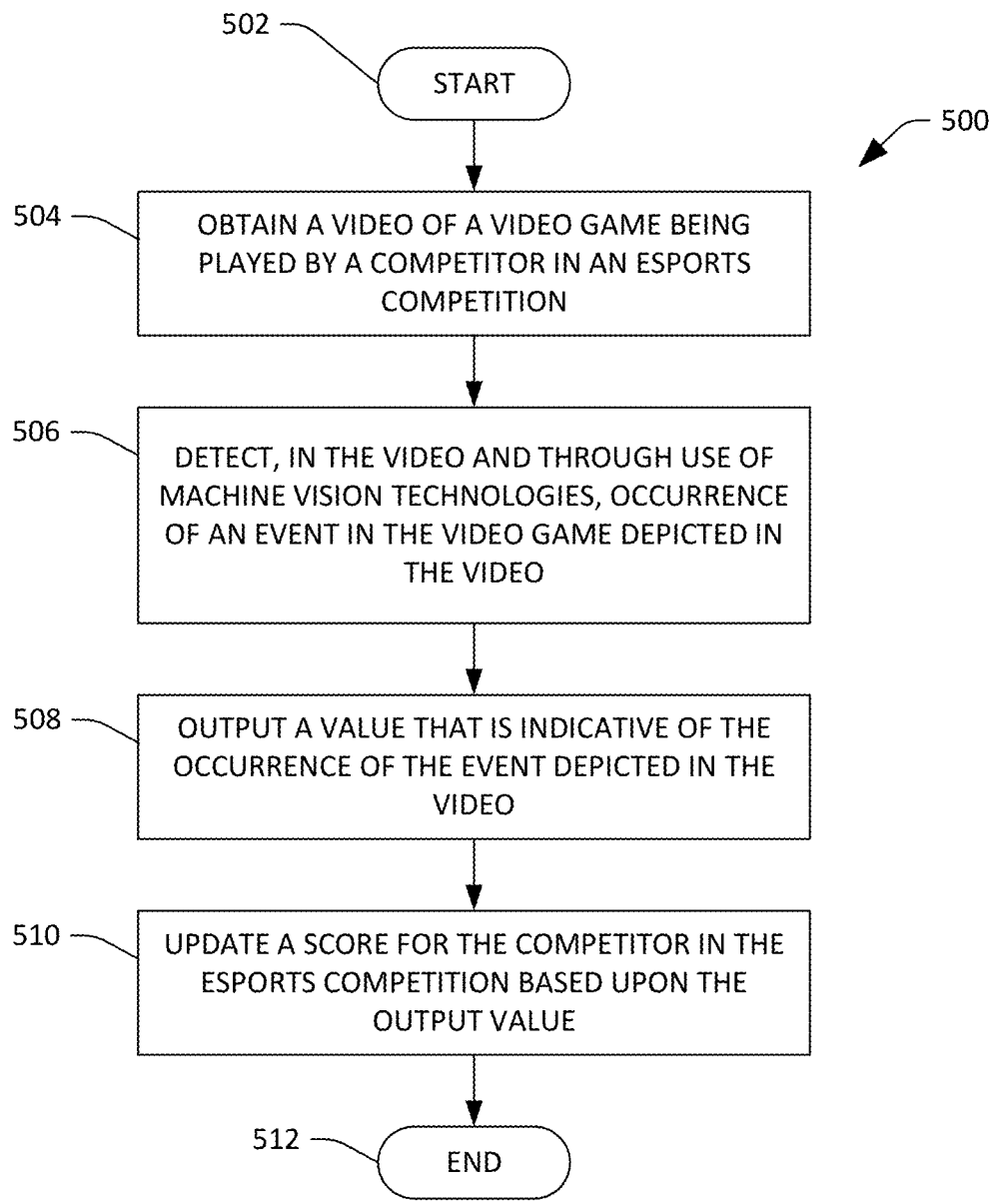
FIG. 5 is a flow diagram illustrating an example methodology for updating a score for a competitor in an esports competition based upon an occurrence of an event recognized in a livestream video of a video game being played by the competitor.
Figure 6:
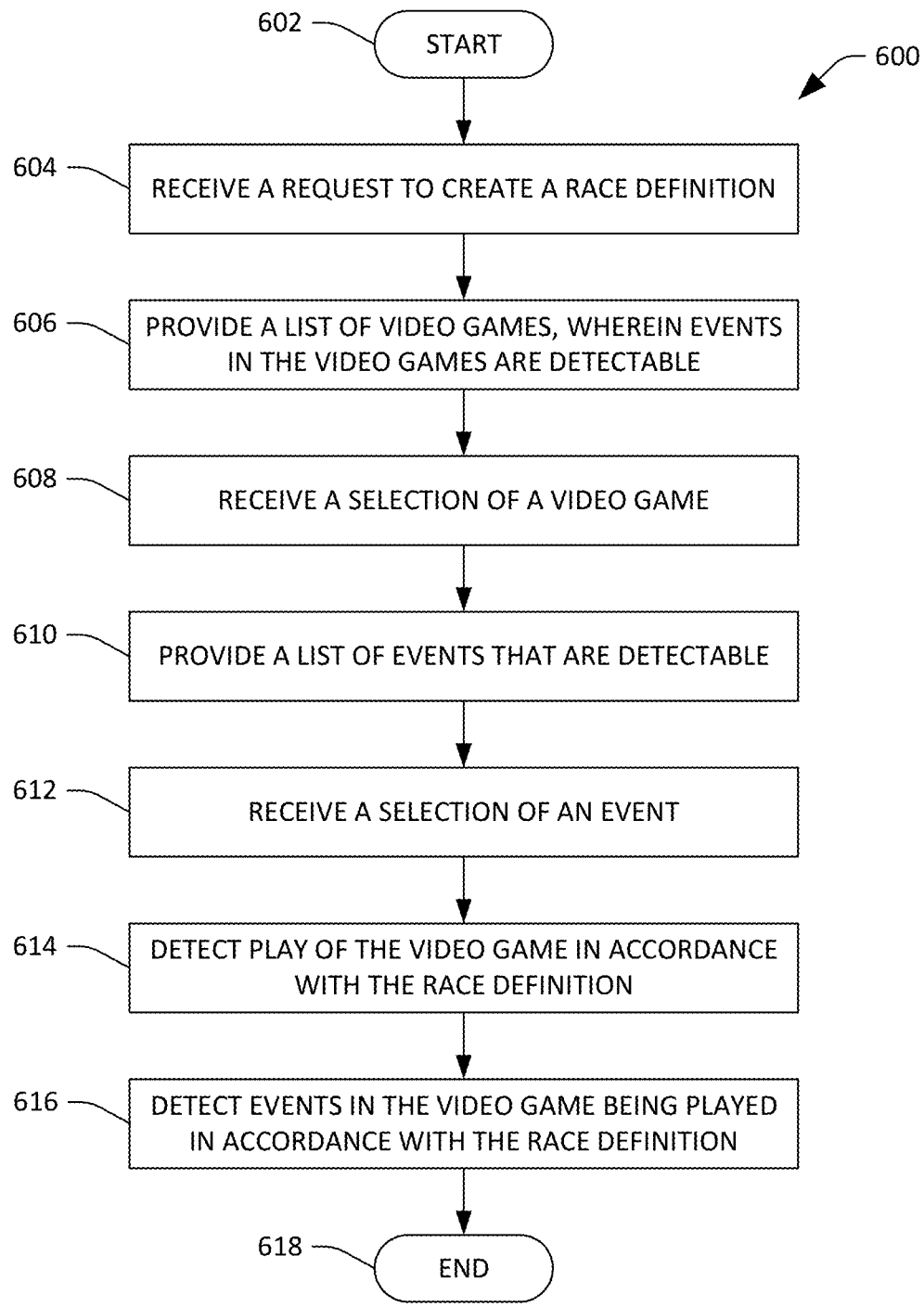
FIG. 6 is a flow diagram of an example methodology for defining an esports competition with a race format.

FIGS. 5 and 6 illustrate example methodologies relating to detecting events in an esports competition. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference now solely to FIG. 5, a flow diagram of an example methodology 500 for updating a score for a competitor in an esports competition is illustrated. The methodology 500 starts at 502, and at 504 a video (e.g., a livestream video) of a video game being played by the competitor is obtained. As indicated previously, an esports competition includes play of a video game by the competitor.

At 506, in the video, and through use of machine vision technologies, occurrence of an event in the video game depicted in the video is detected. The machine vision technologies have been trained to detect occurrences of the event, and outcome of the esports competition is based upon the occurrences of the event in the video game. For instance, the competitor is provided with points each time that the event is detected in the video game being played by the competitor.

At 508, a value that is indicative of the occurrence of the event depicted in the video is output. The value may be a single digit, indicating that the event has occurred. At 510, a score for the video game player in the esports competition is updated based upon the output value. The score can be updated in real-time, such that the score for the video game is updated immediately upon the machine vision technologies detecting occurrence of the event. In another example, the score is updated at the end of the competition (such that competitors are unaware of how other competitors are doing during the competition). The methodology 500 completes at 512.

With reference now to FIG. 6, a flow diagram illustrating an example methodology 600 for running an esports competition is illustrated. The methodology 600 starts at 602, and at 604 a request to create an esports competition definition is received. The request can be received from an administrator of an esports competition platform. In another example, the request is received from a user of a client computing device, where the user wants to create his or her own esports competition.

At 606, upon receipt of the request to create the competition definition, a list of video games is provided to the issuer of the request. As described previously, machine vision technologies are able to detect certain events in each video game provided in the list of video games.

At 608, a selection of a video game from the list is received. At 610, upon receipt of the selection of the video game, a list of events that are detectable in the video game are provided. At 612, a selection of an event in the list of events is received, and at 614 play of the video game in accordance with the competition definition is detected. For example, a user may initiate a livestream video by way of a livestreaming service, where the user indicates that he or she is playing the video game in the competition. At 614, events in the video game being played are detected in accordance with the competition definition. At 616, a score for a competitor in the esports competition is updated based upon the detection of the events in the video game. The methodology completes at 618.

Figure 7:
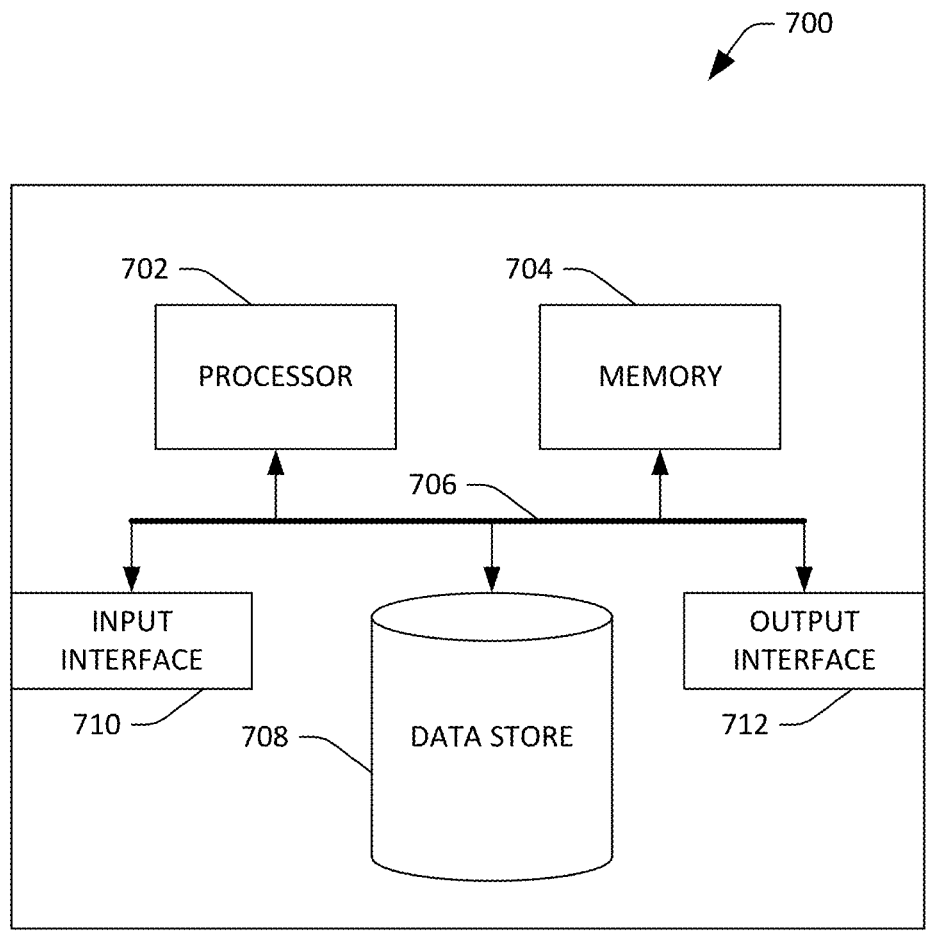
FIG. 7 is an example computing system.

Referring now to FIG. 7, a high-level illustration of an example computing device 700 that can be used in accordance with the systems and methodologies disclosed herein is illustrated. For instance, the computing device 700 may be used in a system that runs an esports competition. By way of another example, the computing device 700 can be used in a system that obtains livestream videos of video games being played by esports competitors and detects occurrences of events in the livestream videos. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store an esports competition definition, scores for esports competitors, etc.

The computing device 700 additionally includes a data store 708 that is accessible by the processor 702 by way of the system bus 706. The data store 708 may include executable instructions, a list of events in video games that can be automatically detected, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

The features described herein relate to identifying occurrences of events in a video of video game play with respect to an esports competition according to at least the examples provided below.

(A1) In one aspect, some embodiments include a computer-implemented method, where the method includes receiving (504) a livestream video of a video game being played by a video game player participating in an esports competition. The method also includes identifying (506), in the livestream video and through use of machine vision technologies, an occurrence of an event in the video game depicted in the livestream video, wherein the event is not tracked within the video game environment, and wherein the machine vision technologies have been trained to detect occurrences of the event. The method additionally includes updating (510) a score for the video game player based on the identification of the occurrence of the event, wherein an outcome of the esports competition is based upon the score.

(A2) In some embodiments of the method of (A1), the method additionally includes receiving a second livestream video of the video game being played by a second video game player participating in the esports competition. The method further includes identifying, in the second livestream video and through use of the machine vision technologies, a second occurrence of the event in the video game depicted in the second livestream video. The method also includes updating a second score for the second video game player based on the identification of the second occurrence of the second event, wherein the outcome of the esports competition is based upon the second score.

(A3) In some embodiments of the method of (A2), at least one of the occurrence of the event or the second occurrence of the event are identified when both the livestream video and the second livestream video are being received at the computing system.

(A4) In some embodiments of any of the methods of (A2)-(A3), the livestream video ceases to be received by the computing system prior to the second livestream video initially being received by the computing system.

(A5) In some embodiments of any of the methods of (A1)-(A4), the method further includes receiving, by way of an application programming interface (API) of the video game being played by the video game player, an indication that a second event has occurred in the video game being played by the video game player, the second event being different from the event. The method also includes updating the score for the video game player based upon the indication that the second event has occurred in the video game being played by the video game player.

(A6) In some embodiments of any of the methods of (A1)-(A5), the method also includes upon receiving the livestream video of a video game, identifying the video game from amongst several possible video games; the method additionally includes selecting a computer-implemented model based upon the identifying of the video game, wherein the computer-implemented model identifies the occurrence of the event.

(A7) In some embodiments of any of the methods of (A1)-(A6), the method also includes identifying, in the livestream video and through use of the machine vision technologies, occurrence of a second event in the video game depicted in the livestream video. The method further includes updating the score for the video game player based upon the identification of the occurrence of the second event in the video game depicted in the livestream video.

(A8) In some embodiments of any of the methods of (A1)-(A7), the method also includes subsequent to the livestream video being received, receiving a second livestream video of the video game being played by the video game player. The method further includes identifying, in the second livestream video and through use of the machine vision technologies, a second occurrence of the event in the video game depicted in the second livestream video. The method additionally includes updating the score for the video game player based upon the identification of the second occurrence of the event in the video game depicted in the livestream video.

(A9) In some embodiments of any of the methods of (A1)-(A8), the method also includes subsequent to the livestream video being received, receiving a second livestream video of a second video game being played by the video game player, wherein the esports competition includes play of the second video game by the video game player. The method further includes identifying, in the second livestream video and through use of the machine vision technologies, an occurrence of a second event in the second video game depicted in the second livestream video. The method also includes updating the score for the video game player based upon the identification of the occurrence of the second event in the second video game depicted in the second livestream video.

(A10) In some embodiments of any of the methods of (A1)-(A9), the livestream video transitions from depicting the video game being played by the video game player to a second video game being played by the video game player. In some embodiments, the method includes identifying, in the livestream video and through use of the machine vision technologies, an occurrence of a second event in the second video game depicted in the livestream video. The method further includes updating the score for the video game player based upon the identification of the occurrence of the second event in the second video game depicted in the second livestream video.

(A11) In some embodiments of any of the methods of (A1)-(A10), the method further includes prior to receiving the livestream video, receiving, from a computing device operated by a designer of the esports competition, an identifier for the video game. The method also includes transmitting, to the computing device, a list of events that occur in the video game, wherein the machine vision technologies are configured to identify occurrences in the video game of each event in the list of events. The method additionally includes subsequent to transmitting the list of events to the computing device, receiving, from the computing device, an indication that the designer of the esports competition has selected the event from the list of events, wherein the machine vision technologies are configured to identify occurrences of the event based upon the indication that the designer of the esports competition has selected the event from the list of events.

(A12) In some embodiments of any of the methods of (A1)-(A11), the esports competition is a bracketed tournament, where the video game player is playing against another video game player in a round of the bracketed tournament.

(B1) In another aspect, some embodiments include a method performed by one or more processors of a computing system, where the method includes receiving (504) a first video, the first video depicting a video game being played by a first video game player. The method also includes receiving a second video, the second video depicting the video game being played by a second video game player, wherein an esports competition that includes a match between the first video game player and the second video game player includes play of the video game by the first video game player and play of the video game by the second video game player. The method additionally includes identifying (506), by a machine vision system and in the first video, several occurrences of an event in the video game being played by the first video game player, wherein the machine vision system is configured to identify occurrences of the event in videos of the video game. The method also includes identifying (506), by the machine vision system and in the second video, several occurrences of the event in the second video game being played by the second video game player, wherein outcome of the match between the first video game player and the second video game player is based upon: a number of identified occurrences of the event in the first video and a number of identified occurrences of the event in the second video.

(B2) In some embodiments of the method of (B1), the method further includes subsequent to receiving the first video, receiving a third video, the third video depicting a second video game being played by the first video game player, wherein the esports competition includes play of the second video game by the first video game player. The method also includes identifying, by the machine vision system and in the third video, several occurrences of a second event in the second video game being played by the first video game player, wherein the machine vision system is configured to identify occurrences of the second event in videos of the second video game, wherein the outcome of the match between the first video game player and the second video game player is based further upon a number of identified occurrences of the second event in the third video.

(B3) In some embodiments of any of the methods of (B1)-(B2), the method includes detecting, in the first video, that the first video depicts a second video game being played by the first video game player, wherein the esports competition includes play of the second video game by the first video game player. The method also includes identifying, by the machine vision system and in the first video, several occurrences of a second event in the second video game being played by the first video game player, wherein the machine vision system is configured to identify occurrences of the second event in videos of the second video game, wherein the outcome of the match between the first video game player and the second video game player is based further upon a number of identified occurrences of the second event in the first video.

(B4) In some embodiments of any of the methods of (B1)-(B3), the first and second videos are livestream videos, and the method also includes detecting that the number of identified occurrences of the event in the first livestream video has reached a predefined threshold prior to the number of identified occurrences of the event in the second livestream video reaching the predefined threshold. The method additionally includes outputting an indication that the first video game player has won the match.

(B5) In some embodiments of any of the methods of (B1)-(B4), the first video is streamed during a first window of time, the second video is streamed during a second window of time, the first window of time and the second window of time being non-overlapping.

(B6) In some embodiments of any of the methods of (B1)-(B4), the first video is streamed during a first window of time, the second video is streamed during a second window of time, the first window of time overlapping with the second window of time.

(C1) In another aspect, some embodiments include a method performed by one or more processors of a computing system, where the method includes receiving (504) a livestream video of a video game being played by a video game player who is a participant in an esports competition that includes play of the video game. The method also includes identifying (506), in the livestream video and through use of machine vision technologies, that an event has occurred in the video game depicted in the livestream video, where the machine vision technologies have been trained to detect occurrences of the event. The method additionally includes updating (508) a score for the video game player in the esports competition based upon the identification that the event has occurred in the video game depicted in the livestream video.

(D1) In still yet another aspect, some embodiments include a computing system that includes a processor (114) and memory (116), where the memory has instructions stored therein that, when executed by the processor, cause the processor to perform any of the methods described herein (e.g., any of (A1)-(A12), (B1)-B(6), and/or (C1)).

(E1) In yet another aspect, some embodiments include a computer-readable storage medium that includes instructions that, when executed by a processor, cause the processor to perform any of the methods described herein (e.g., any of (A1)-(A12), (B1)-B(6), and/or (C1)).

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The term "or", as used herein, is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "system", and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
a processor; and
memory storing instructions that, when executed by the processor, cause the processor to perform acts comprising:
receiving a livestream video of a video game being played by a video game player participating in an esports competition;
identifying, in the livestream video and through use of machine vision technologies, an occurrence of an event in the video game depicted in the livestream video, wherein the event is not tracked within the video game environment, and wherein the machine vision technologies have been trained to detect occurrences of the event;
updating a score for the video game player based on the identification of the occurrence of the event;
receiving a second livestream video of the video game being played by a second video game player participating in the esports competition;
identifying, in the second livestream video and through use of the machine vision technologies, a second occurrence of the event in the video game depicted in the second livestream video; and
updating a second score for the second video game player based on the identification of the second occurrence of the second event, wherein an outcome of the esports competition is based upon the score and the second score.

2. The computing system of claim 1, wherein at least one of the occurrence of the event or the second occurrence of the event are identified when both the livestream video and the second livestream video are being received at the computing system.

3. The computing system of claim 1, wherein the livestream video ceases to be received by the computing system prior to the second livestream video initially being received by the computing system.

4. The computing system of claim 1, the acts further comprising:
receiving, by way of an application programming interface (API) of the video game being played by the video game player, an indication that a second event has occurred in the video game being played by the video game player, the second event being different from the event; and
updating the score for the video game player based upon the indication that the second event has occurred in the video game being played by the video game player.

5. The computing system of claim 1, the acts further comprising:
upon receiving the livestream video of a video game, identifying the video game from amongst several possible video games; and
selecting a computer-implemented model based upon the identifying of the video game, wherein the computer-implemented model identifies the occurrence of the event.

6. The computing system of claim 1, the acts further comprising:
identifying, in the livestream video and through use of the machine vision technologies, occurrence of a second event in the video game depicted in the livestream video; and
updating the score for the video game player based upon the identification of the occurrence of the second event in the video game depicted in the livestream video.

7. The computing system of claim 1, the acts further comprising:
subsequent to the livestream video being received, receiving a third livestream video of the video game being played by the video game player;
identifying, in the third livestream video and through use of the machine vision technologies, a second third occurrence of the event in the video game depicted in the third livestream video; and
updating the score for the video game player based upon the identification of the third occurrence of the event in the video game depicted in the livestream video.

8. The computing system of claim 1, the acts further comprising:
subsequent to the livestream video being received, receiving a third livestream video of a second video game being played by the video game player, wherein the esports competition includes play of the second video game by the video game player;
identifying, in the third livestream video and through use of the machine vision technologies, an occurrence of a third event in the second video game depicted in the third livestream video; and
updating the score for the video game player based upon the identification of the occurrence of the third event in the second video game depicted in the third livestream video.

9. The computing system of claim 1, wherein the livestream video transitions from depicting the video game being played by the video game player to a second video game being played by the video game player, the acts further comprising:
identifying, in the livestream video and through use of the machine vision technologies, an occurrence of a second event in the second video game depicted in the livestream video; and
updating the score for the video game player based upon the identification of the occurrence of the second event in the second video game depicted in the second livestream video.

10. The computing system of claim 1, the acts further comprising:
prior to receiving the livestream video, receiving, from a computing device operated by a designer of the esports competition, an identifier for the video game;
transmitting, to the computing device, a list of events that occur in the video game, wherein the machine vision technologies are configured to identify occurrences in the video game of each event in the list of events; and
subsequent to transmitting the list of events to the computing device, receiving, from the computing device, an indication that the designer of the esports competition has selected the event from the list of events, wherein the machine vision technologies are configured to identify occurrences of the event based upon the indication that the designer of the esports competition has selected the event from the list of events.

11. The computing system of claim 1, wherein the esports competition is a bracketed tournament, where the video game player is playing against the second video game player in a round of the bracketed tournament.

12. A method performed by one or more processors of a computing system, the method comprising:
receiving a first video, the first video depicting a video game being played by a first video game player;
receiving a second video, the second video depicting the video game being played by a second video game player, wherein an esports competition that includes a match between the first video game player and the second video game player includes play of the video game by the first video game player and play of the video game by the second video game player;
identifying, by a machine vision system and in the first video, several occurrences of an event in the video game being played by the first video game player, wherein the machine vision system is configured to identify occurrences of the event in videos of the video game; and
identifying, by the machine vision system and in the second video, several occurrences of the event in the second video game being played by the second video game player, wherein outcome of the match between the first video game player and the second video game player is based upon:
a number of identified occurrences of the event in the first video; and
a number of identified occurrences of the event in the second video.

13. The method of claim 12, further comprising:
subsequent to receiving the first video, receiving a third video, the third video depicting a second video game being played by the first video game player, wherein the esports competition includes play of the second video game by the first video game player; and
identifying, by the machine vision system and in the third video, several occurrences of a second event in the second video game being played by the first video game player, wherein the machine vision system is configured to identify occurrences of the second event in videos of the second video game, wherein the outcome of the match between the first video game player and the second video game player is based further upon a number of identified occurrences of the second event in the third video.

14. The method of claim 12, further comprising:
detecting, in the first video, that the first video depicts a second video game being played by the first video game player, wherein the esports competition includes play of the second video game by the first video game player; and
identifying, by the machine vision system and in the first video, several occurrences of a second event in the second video game being played by the first video game player, wherein the machine vision system is configured to identify occurrences of the second event in videos of the second video game, wherein the outcome of the match between the first video game player and the second video game player is based further upon a number of identified occurrences of the second event in the first video.

15. The method of claim 12, wherein the first and second videos are livestream videos, the method further comprising:
detecting that the number of identified occurrences of the event in the first livestream video has reached a predefined threshold prior to the number of identified occurrences of the event in the second livestream video reaching the predefined threshold; and
outputting an indication that the first video game player has won the match.

16. The method of claim 12, wherein the first video is a livestream video, the method further comprising:
detecting that the video game has initially been depicted in the first livestream video;
upon detecting that the video game has initially been depicted in the first livestream video, defining an end time; and
upon the end time being reached, ceasing to identify occurrences of the event in the first livestream video.

17. The method of claim 12, wherein the first video is streamed during a first window of time, the second video is streamed during a second window of time, the first window of time and the second window of time being non-overlapping.

18. The method of claim 12, wherein the first video is streamed during a first window of time, the second video is streamed during a second window of time, the first window of time overlapping with the second window of time.

19. A computer-readable storage medium comprising instructions that, when executed by a processor, cause the processor to perform acts comprising:
receiving a livestream video of a video game being played by a video game player who is a participant in an esports competition that includes play of the video game;
identifying, in the livestream video and through use of machine vision technologies, that an event has occurred in the video game depicted in the livestream video, wherein the machine vision technologies have been trained to detect occurrences of the event;
updating a score for the video game player in the esports competition based upon the identification that the event has occurred in the video game depicted in the livestream video;
receiving a second livestream video of the video game being played by a second video game player participating in the esports competition;
identifying, in the second livestream video and through use of the machine vision technologies, a second occurrence of the event in the video game depicted in the second livestream video; and
updating a second score for the second video game player based on the identification of the second occurrence of the second event, wherein an outcome of the esports competition is based upon the score and the second score.

20. the computer-readable storage medium of claim 19, wherein at least one of the occurrence of the event or the second occurrence of the event are identified when both the livestream video and the second livestream video are being received.

\* \* \* \* \*